United States Patent
Paterson et al.

(10) Patent No.: US 11,164,545 B2
(45) Date of Patent: Nov. 2, 2021

(54) COMPRESSION OF DISPLAY DATA

(71) Applicant: DisplayLink (UK) Limited, Cambridge (GB)

(72) Inventors: Andrew Paterson, Cambridge (GB); Trevor Hall, Middlesex (GB); Douglas Morse, Huntingdon (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/506,533

(22) Filed: Jul. 9, 2019

(65) Prior Publication Data

US 2020/0020304 A1 Jan. 16, 2020

(30) Foreign Application Priority Data

Jul. 10, 2018 (GB) .................................... 1811290

(51) Int. Cl.
*G09G 5/28* (2006.01)
*G09G 5/30* (2006.01)
(Continued)

(52) U.S. Cl.
CPC ............. *G09G 5/28* (2013.01); *G02B 27/017* (2013.01); *G06K 9/00671* (2013.01); *G06T 7/80* (2017.01);
(Continued)

(58) Field of Classification Search
CPC .... G02B 27/017; G06T 7/80; G09G 2350/00; G09G 2340/02; G09G 5/30; G09G 5/28; G09G 5/026; G09G 5/005; G09G 2340/0435; G09G 2340/0428; G06K 9/00671; H04N 21/2343; H04N 19/164;
(Continued)

(56) References Cited

U.S. PATENT DOCUMENTS

| 2003/0039398 A1* | 2/2003 | McIntyre ......... H04N 21/44209 382/239 |
| 2004/0010803 A1* | 1/2004 | Berstis ................... H04N 7/185 725/105 |

(Continued)

OTHER PUBLICATIONS

Search Report for Application GB1811290.4, dated Dec. 24, 2018, 4 pages.

*Primary Examiner* — Michael Le
(74) *Attorney, Agent, or Firm* — Paradice & Li LLP (57) ABSTRACT

A method involves receiving, at a host device, information indicative of available bandwidth on a variable bandwidth connection between the host device and a display control device, which may be based on monitoring a signal level on the connection, a link radio modulation mode, traffic on the connection, or the data rate of any return signals from the display control device. The method includes setting one or more parameters used to generate the display data that change compressibility of the display data based on the information, where compressibility of the display data affects efficiency of compression of the display data, and where the setting of the parameters may be based on a compression algorithm used when compressing the display data. The method includes generating the display data using the one or more parameters, compressing the display data, and transmitting the display data to the display control device.

19 Claims, 8 Drawing Sheets

(51) Int. Cl.
*G06T 7/80* (2017.01)
*G02B 27/01* (2006.01)
*G06K 9/00* (2006.01)

(52) U.S. Cl.
CPC ........... *G09G 5/30* (2013.01); *G09G 2340/02* (2013.01); *G09G 2350/00* (2013.01)

(58) Field of Classification Search
CPC ... H04N 21/238; H04N 21/2402; H04L 65/60
See application file for complete search history.

(56) References Cited

U.S. PATENT DOCUMENTS

| | | | |
|---|---|---|---|
| 2007/0053428 A1* | 3/2007 | Saleem ................. | H04N 19/31 375/240 |
| 2010/0017047 A1* | 1/2010 | Sanders-Reed .......... | G06F 3/14 701/3 |
| 2010/0166063 A1* | 7/2010 | Perlman ................. | A63F 13/12 375/240.07 |
| 2011/0145879 A1 | 6/2011 | Rajamani et al. | |
| 2013/0160058 A1* | 6/2013 | Albal ................... | H04W 28/02 725/62 |
| 2014/0146874 A1* | 5/2014 | Ju ........................ | H04N 19/10 375/240.02 |
| 2014/0344443 A1 | 11/2014 | Macinnis et al. | |
| 2015/0348493 A1* | 12/2015 | Chae ...................... | G09G 5/00 345/212 |
| 2016/0295250 A1 | 10/2016 | Yang et al. | |
| 2018/0027041 A1* | 1/2018 | Yuen ..................... | H04L 65/80 709/247 |
| 2018/0082119 A1* | 3/2018 | Zilberman ......... | G06K 9/00671 |
| 2018/0309986 A1* | 10/2018 | Edpalm ............... | H04N 19/115 |

\* cited by examiner

| Encoder Type | DCT-Based | Wavelet-Based | Motion Estimation |
|---|---|---|---|
| Reduction in Colour Depth | ++ | ++ | |
| Matching Internal Codec Quantisation | + | + | |
| Matching Colour Space | + | + | |
| Reduction in Spatial Frequency | ++ | - | |
| Reduction in Frame Rate | | | - |
| Reduction in Supersampling | + | | |
| Examples | H.264, H.265, HEVC | JPEG XS | H.264, H.265, HEVC |

Figure 6

COMPRESSION OF DISPLAY DATA

CROSS REFERENCE TO RELATED APPLICATIONS

This application claims priority to GB Application No. 1811290.4, filed Jul. 10, 2018, which application is hereby incorporated in its entirety herein.

BACKGROUND

In mobile display systems, especially high-immersion systems such as virtual reality, a vital component of the display experience is smooth flowing motion in response to body and head movements. Momentary freezing or stuttering of the displayed images destroys the illusion and causes the person using it to drop out of the immersive experience. It may also result in physical effects such as motion sickness. It is therefore important to avoid any such interference.

As it becomes more common for such mobile display systems to be connected wirelessly to host devices which provide the display data, it is also more likely that the video feed will be degraded by physical obstacles to the signal or interference from other wireless signals. This can interfere with the smooth flow of the video.

Conventional methods for dealing with such interference include buffering the video signal, which adds additional delay, or increasing the compression of the video signal in order to transmit it more quickly or across reduced bandwidth, which may add visible display artefacts.

The methods of the invention seek to mitigate this problem.

SUMMARY

Accordingly, in a first aspect, the invention provides a method of generating display data by a host device for transmission over a variable bandwidth connection to a display control device for display, the method comprising:
  receiving, at the host device, information indicative of available bandwidth on the variable bandwidth connection between the host device and the display control device;
  setting, at the host device, based on the information indicative of the available bandwidth, one or more parameters used to generate the display data that change compressibility of the display data, wherein compressibility of the display data affects efficiency of compression of the display data;
  generating, at the host device, the display data using the one or more parameters;
  compressing the generated display data; and
  transmitting the compressed display data to the display control device.

In a preferred embodiment, the information indicative of available bandwidth on the connection provides information indicative of a change in the available bandwidth.

In an embodiment, the method further comprises comparing the information indicative of available bandwidth on the connection with one or more threshold levels and wherein the setting one or more parameters is based on whether the information is above or below the one or more threshold levels.

If the comparison indicates that the bandwidth is below a first threshold, one or more of the parameters are preferably set so that the generated data has a first compressibility. Preferably, if the comparison indicates that the bandwidth is above the first threshold, one or more of the parameters are set so that the generated data has a second compressibility, lower than the first compressibility. Preferably, if the comparison indicates that the bandwidth is above a second threshold, one or more of the parameters are set so that the generated data has a third compressibility, lower than the second compressibility.

Different parameters of the one or more parameters are preferably adjusted based on whether the information is above or below the one or more threshold levels.

In a preferred embodiment, the information indicative of available bandwidth is based on monitoring a signal level on a connection, a link radio modulation mode, traffic on the connection, or the data rate of any return signals from the display control device.

The one or more parameters are preferably chosen from parameters controlling colour depth, colour space, spatial frequency, quantisation level, supersampling, and frame rate. Preferably, the setting of the one or more parameters is further based on a compression algorithm used when compressing the display data.

According to a second aspect, the invention provides a host device configured to generate display data by performing all steps of a method as described above.

According to a third aspect, the invention provides a system comprising a host device as described above and a display control device coupled to the host device over a variable bandwidth connection.

Preferably, the display control device provides at least some of the information indicative of available bandwidth on the connection.

According to another aspect of the invention, there is provided a method of improving the efficiency of compression by increasing the compressibility of rendered display data, comprising:
  1. A host device receiving feedback indicating the available bandwidth of a connection to a mobile display device;
  2. The host device passing the feedback to an application generating display data;
  3. The application comparing the bandwidth to a threshold;
  4. If the bandwidth is above the threshold, the application producing display data at a first level of compressibility;
  5. Otherwise, the host device producing display data at a second level of compressibility;
  6. The application passing the display data to a compression engine for compression;
  7. The compression engine compressing the display data;
  8. The host device transmitting the display data for display.

This method applies a bandwidth threshold to the generation of the data rather than the compression of the data, which is beneficial because it means that the data input to the compression engine will be optimised for the most effective compression. This will result in lower data volume and therefore a higher chance that display data will be received in time for display when transmitted across a bandwidth-limited connection, which will reduce the chances of dropped frames and the resulting visual artefacts such as judder or tearing. While the use of less-complex display data may result in a lower-fidelity visual experience for a user, this approach is likely to give a better overall experience.

There may be multiple thresholds and accompanying levels of compressibility in use to fine-tune the system. The thresholds may be determined by analysis of the bandwidth required for smooth video of different complexities and may be determined during configuration of the specific system or pre-programmed into the host device based on a model of the expected behaviour of a system.

The host device may use one of a number of methods of increasing the compressibility of the display data and may use different methods depending on which of a number of thresholds is in use. For example, the host device may reduce the resolution of a peripheral area of a display when the bandwidth is below a first threshold and reduce the resolution of the entire frame when the bandwidth is below a second, lower threshold.

Other methods of increasing the compressibility of the display data may include reducing the colour depth of the display data up to and including reducing the colour depth to grayscale or using a low-pass filter to smooth the corners of complex objects in an image.

Optionally, when the display data is decompressed for display, a device connected to or integrated into the decompression engine may attempt to reverse the increase in compressibility, for example by applying an equaliser to reverse the effects of a low-pass filter or by increasing the colour depth according to a pre-programmed mapping or set of heuristics.

The mobile display device may be a head-mounted display device such as a virtual-reality (VR) or augmented-reality (AR) headset.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
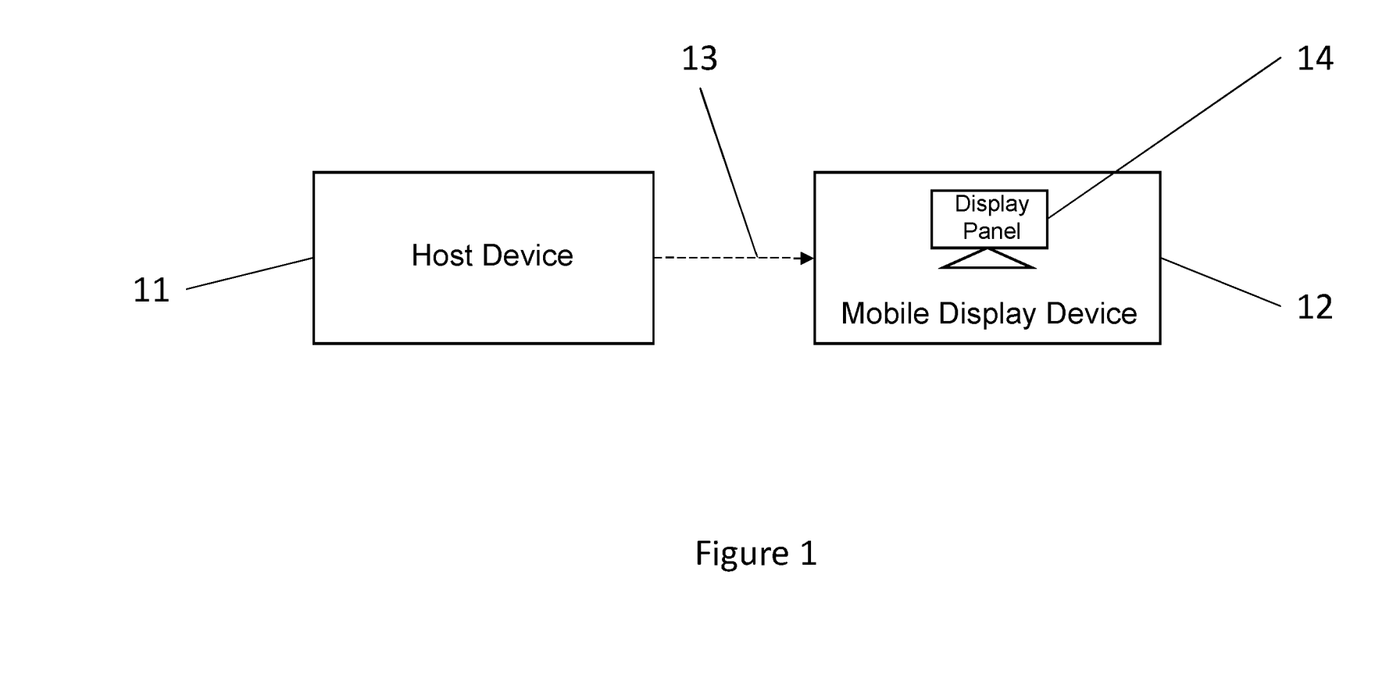
FIG. 1 shows one embodiment of a system comprising a host device and a mobile display device.

FIG. 1 shows a host device [11] such as a computing device or gaming console which is connected [13] to a mobile display device [12] such as a VR or AR headset, the connection indicated with a dashed line [13]. The mobile display device [12] incorporates a display panel [14]. The host device [11] generates display data and transmits it over the connection [13] to the mobile display device [12], where it is displayed on the display panel [14]. The connection [13] can be any variable-bandwidth wired or wireless connection and may be over a network connection such as Ethernet.

Figure 2A:
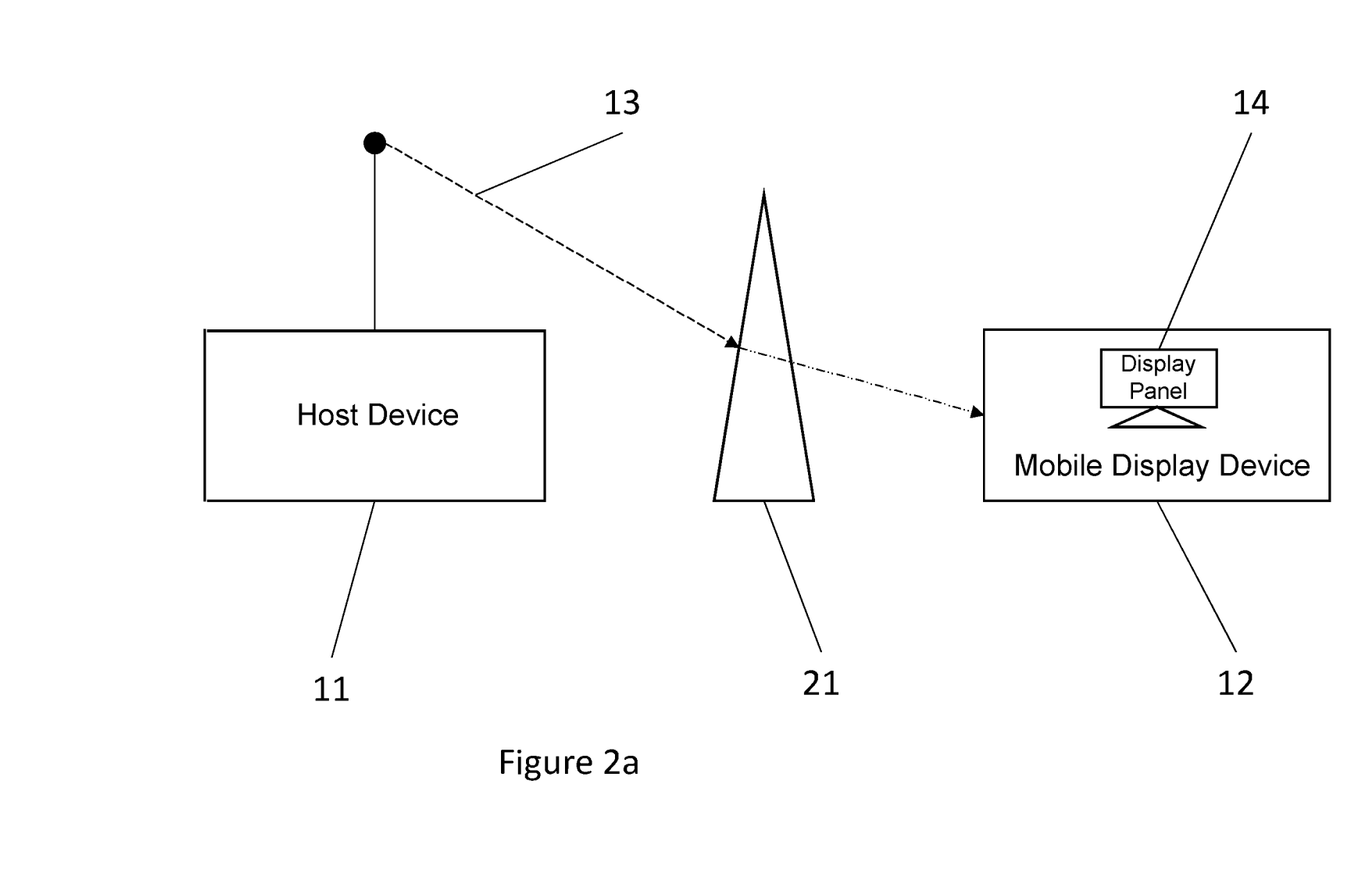
FIGS. 2a and 2b show the same system with impediments.

FIGS. 2a and 2b show ways in which a connection [13] such as that shown in FIG. 1 can be compromised. FIG. 2a shows a system in which the host device [11] has an antenna and is connected wirelessly to the mobile display device [12]. FIG. 2a also shows an obstruction [21] in the path of the wireless signal [14] between the antenna on the host device [11] and the mobile display device [12]. The wireless signal [13] has to pass through this obstruction [22], and this reduces the available bandwidth, so the data is received more slowly by the mobile display device [12] and may be affected by corruption and distortions. This is indicated in the Figure by the transition between a dashed line to indicate the signal to a line with alternating dots and dashes.

Figure 2B:
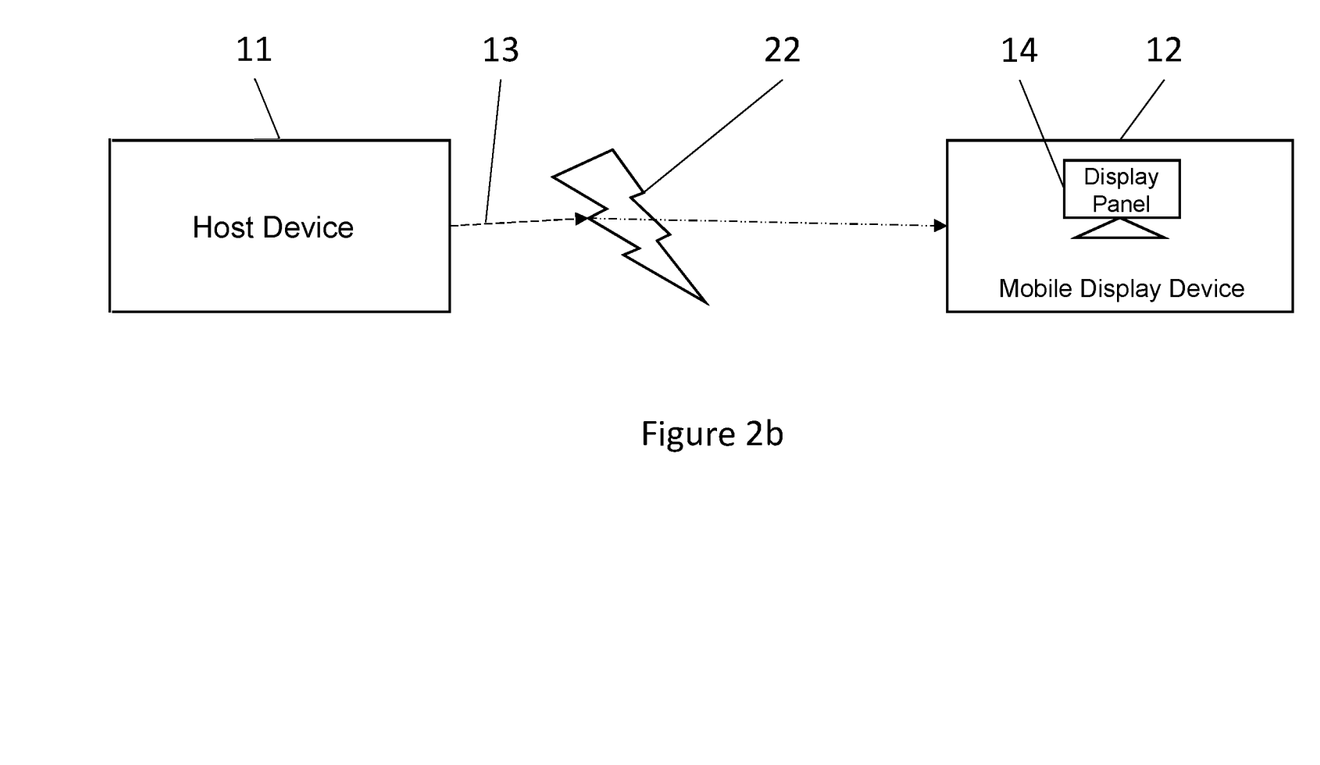

Similarly, FIG. 2b shows a system in which the host device [11] has a wired connection to the mobile display device [12], but there is now interference [22] in the form of interfering radio signals or increased traffic on the connection. These can interfere with the connection [13] and reduce the available bandwidth or distort the data in a similar way to an actual obstacle [21], indicated in the Figure by the transition between a dashed line to indicate the connection [13] and a line with alternating dashes and dots.

Naturally, interference [22] may also affect a wireless connection [13].

Unlike many other attributes of a system, bandwidth is variable, and it is ineffective to configure a system according to an initial bandwidth. In both cases shown in FIG. 2, the bandwidth may be reduced over a period of time, the data may be distorted and require re-transmission, thereby increasing the traffic on the connection [13], or the connection [13] may be briefly interrupted. All these possibilities are described as a reduction in bandwidth for the purposes of this description and demonstrate that such a reduction may be temporary.

Figure 3A:
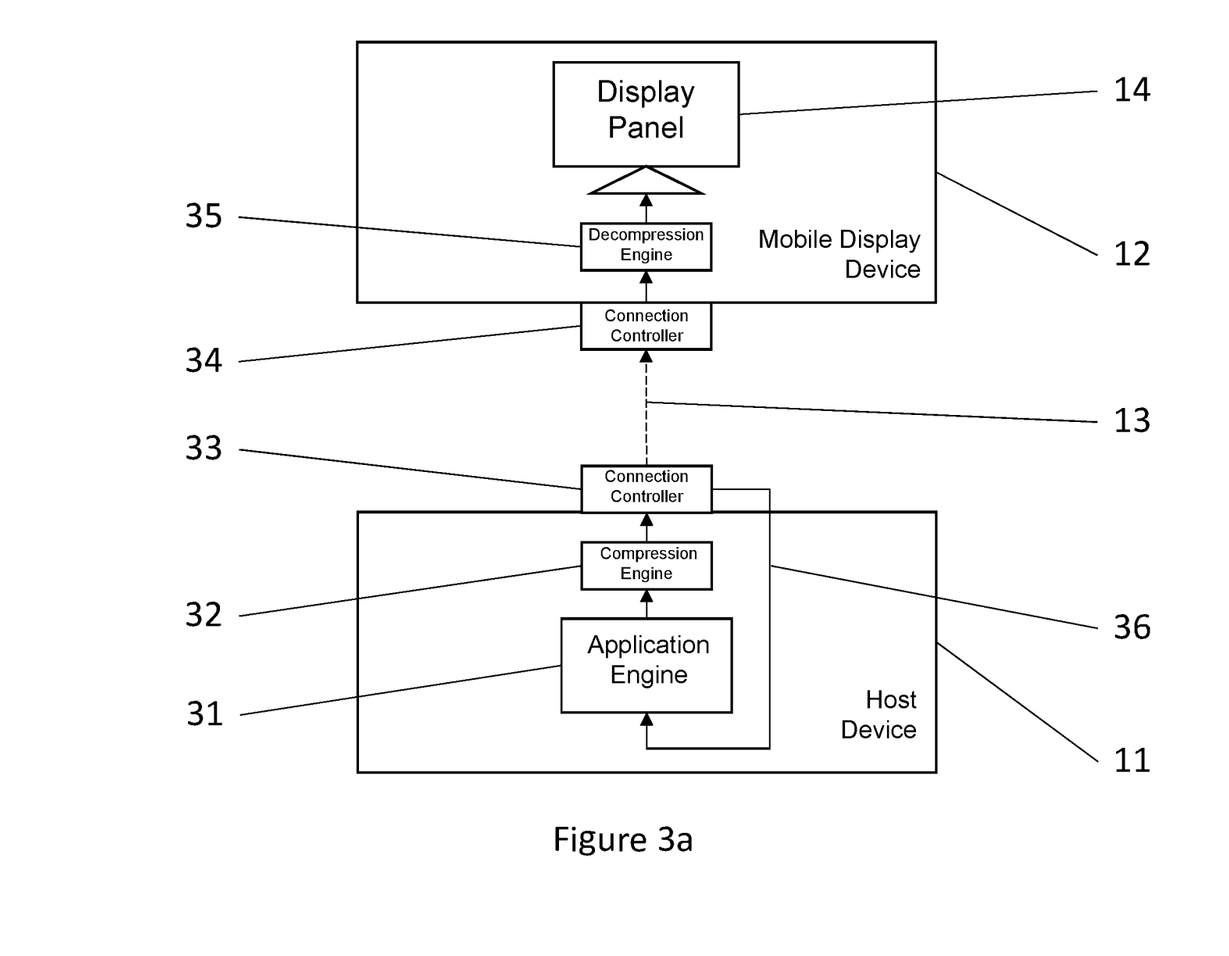
FIGS. 3a and 3b show details of some internal components of the devices.

FIG. 3a shows a simplified block diagram of some internal components of the devices [11, 12]. As previously mentioned, the host device [11] is connected [13] to the mobile display device [12], which incorporates, among other components, an integral display panel [14]. The mobile display device [12] also incorporates a decompression engine [35] and a device-side connection controller [34], which controls the receipt of display data from the host device [11] and may also be able to communicate with the host device [11] to negotiate the connection [13] and to transmit data on the connection [13] to the host-side connection controller [33] on the host device [11].

The host device [11] incorporates, among other components, the aforementioned host-side connection controller [33], a compression engine [32], and an application engine [31] which generates display data for display on the mobile display device [12]. The compression engine [32] receives display data from the application engine [31] and encodes and compresses data prior to transmission and the decompression engine [35] on the mobile display device [12] decodes and decompress the data prior to display.

As well as a connection to the compression engine [32] so that it can receive compressed data for transmission, the host-side connection controller [33] has a connection [36] to the application engine [31] for sending signals to the application engine [31]. These signals include feedback on the connection [13] to allow the application engine [31] to carry out embodiments of the invention.

Figure 3B:
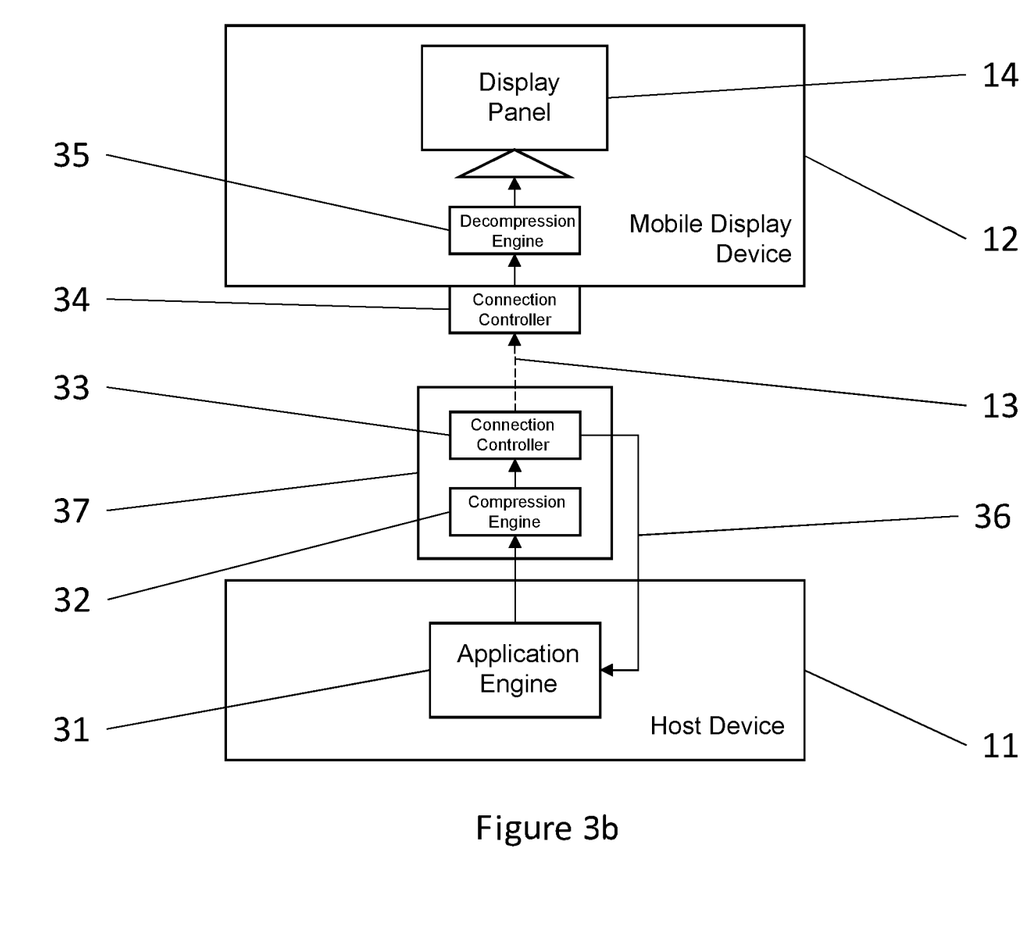

FIG. 3b shows a similar block diagram showing internal components of the devices [11, 12], but in this case the host-side connection controller [33] and the compression engine [32] are contained in a separate device such as an adapter [37]. The connection [13] is therefore between the adapter [37] and the mobile display device [12]. Otherwise, the components involved are the same as those described in FIG. 3a.

Figure 4:
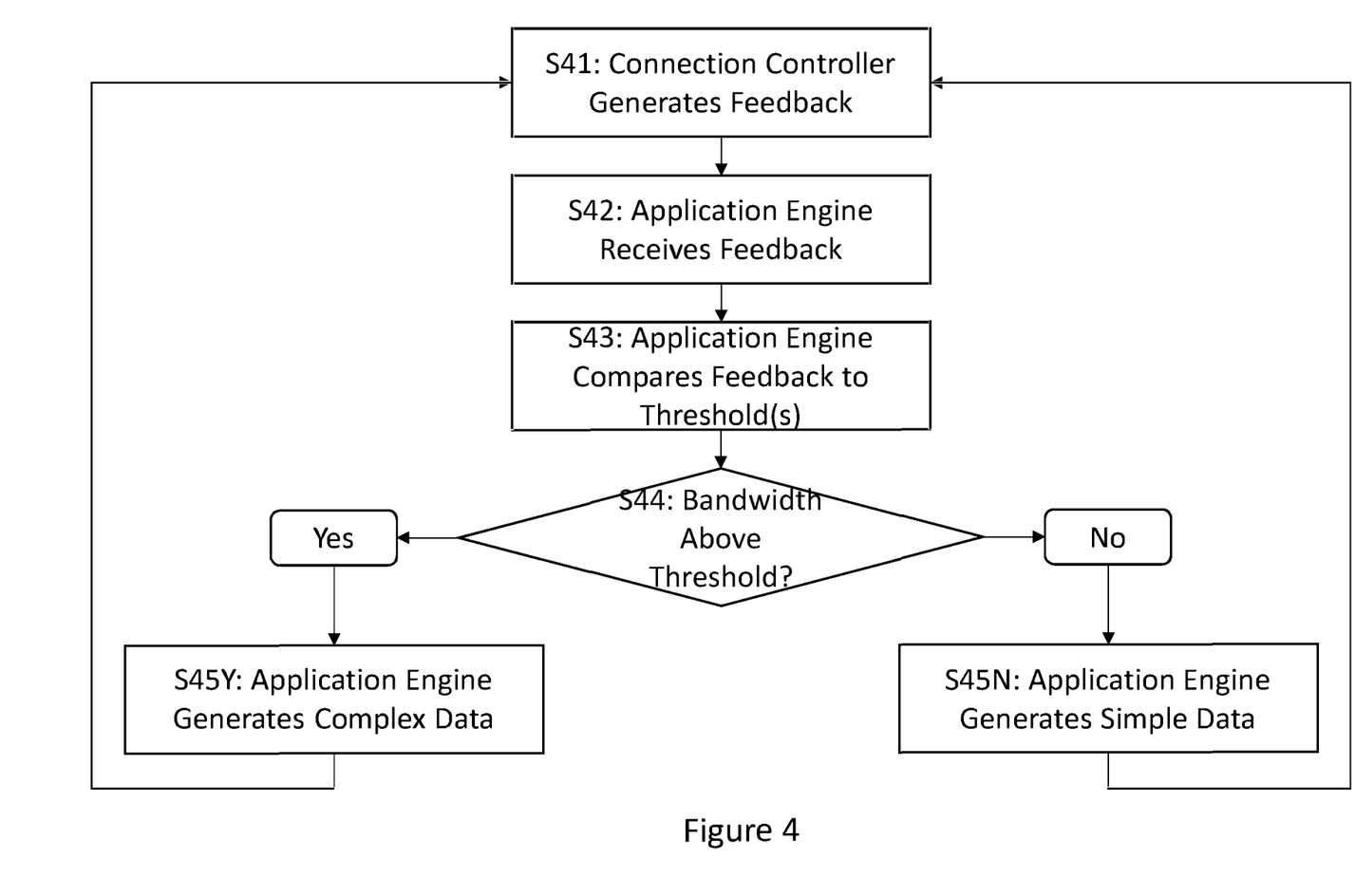
FIG. 4 shows an example process of an embodiment of the invention.

FIG. 4 shows an example process of the invention using the embodiment shown in FIG. 3.

At Step S41, the host-side connection controller [32] monitors the connection [13] and generates feedback [34]. This may involve monitoring the signal level, a link radio modulation mode, the traffic on the connection [13], or the data rate of any return signals from the mobile display device [12]. The host-side connection controller [32] may also receive information from the display-side connection controller [33] indicating any problems with the connection [13] as previous data was being transmitted.

The host-side connection controller [32] may constantly monitor the connection [13] and generate feedback, or it may only do so periodically, such as at a particular point in the transmission of each frame. In any case, it is able to detect changes in the bandwidth over time and produce feedback [34] accordingly. This is distinct from similar conventional systems which, for example, adjust the resolution of generated data in order to account for a low-resolution display panel [14], since such inadequacies are not variable and the system is only configured once, at set-up. If there is insufficient bandwidth, transmission fails. This method allows configuration to be continued throughout the life of the connection through feedback [34].

At Step S42, the host-side connection controller [32] transmits the feedback [34] to the application engine [31]. If the feedback [34] is generated periodically it may be sent as soon as it has been generated. If it is generated constantly it may be transmitted constantly or it may be transmitted periodically; for example, an average bandwidth over the period may be encapsulated in the feedback [34] and transmitted to the application [31]. Alternatively, the feedback [34] may be transmitted when certain trigger conditions occur, for example if the connection status changes.

At Step S43, the application engine [31] compares the bandwidth received through the feedback [34] to one or more thresholds. The thresholds may be stored in the code of the application engine [31] or may be general values stored in memory elsewhere on the host device [11].

As previously suggested, there may be only one threshold in a relatively coarse system, by which the application engine [31] generates data at a normal level of compressibility or an increased level. Alternatively, there may be multiple thresholds, either at different levels or of different types; for example, if there are multiple methods for determining that bandwidth has been reduced, the method used may be included in the feedback and a different threshold applied in each case.

In any case, for each threshold, the application engine [31] determines whether the bandwidth is above the threshold at Step S44.

If the bandwidth is above the threshold, the process proceeds to Step S55Y and the application engine [31] generates data at a relatively low level of compressibility. This may mean generating the data at full complexity or at a level reduced from full complexity that therefore has higher than usual compressibility if, for example, the bandwidth is still below a different threshold. "Complexity", in this context, refers to any aspects of the generated display data that will make the data more complicated to encode, including colour depth, resolution, and entropy.

Furthermore, it may mean reducing the level of compressibility of the data from a previous level, or simply refraining from increasing it.

If the bandwidth is below the threshold, the process proceeds to Step S45N and the application engine [31] generates data at a relatively high level of compressibility. As previously mentioned, this may mean increasing the compressibility of the data or simply refraining from reducing it, and the level chosen may also depend on other thresholds in use.

The application engine [31] may use one of several strategies to increase the compressibility of the data and may apply more than one simultaneously or different strategies under different circumstances. For example, when the available bandwidth is at a first level it may apply one strategy, and if the bandwidth falls to a second, lower, level it may then apply a second strategy in addition to the first, or it may stop applying the first strategy and apply the second instead. The choices of strategies may be associated with different thresholds or compression algorithms or they may be determined on the fly based on considerations such as processing power available.

Examples of strategies include:
Reducing the resolution of the display data, thus reducing the detail of the images;
Reducing resolution at the edges only while retaining full resolution at the centre;
Reducing colour depth to different degrees, with the greatest reduction resulting in a monochrome image;
Reducing greyscale dynamic range;
Increasing colour quantisation, leading to a posterised image;
Changing the colour space used;
Transmitting only part of the data, for example the Y component in a YUV colour space;
Reducing the level of shading applied to 3D objects;
Refraining from applying Mura correction to the data;
Reducing the dimensions of a frame so it must be scaled up for display.

The application engine [31] then passes the display data to the compression engine [32], which compresses it for transmission to the mobile display device [12]. Thus, the display data should then be at an appropriate level of compressibility to allow the most efficient compression for the bandwidth available, while still maintaining the visual quality of the display data as much as possible.

In either case, the process then returns to S41 and the host-side connection controller [33] continues to generate feedback.

Figure 5:
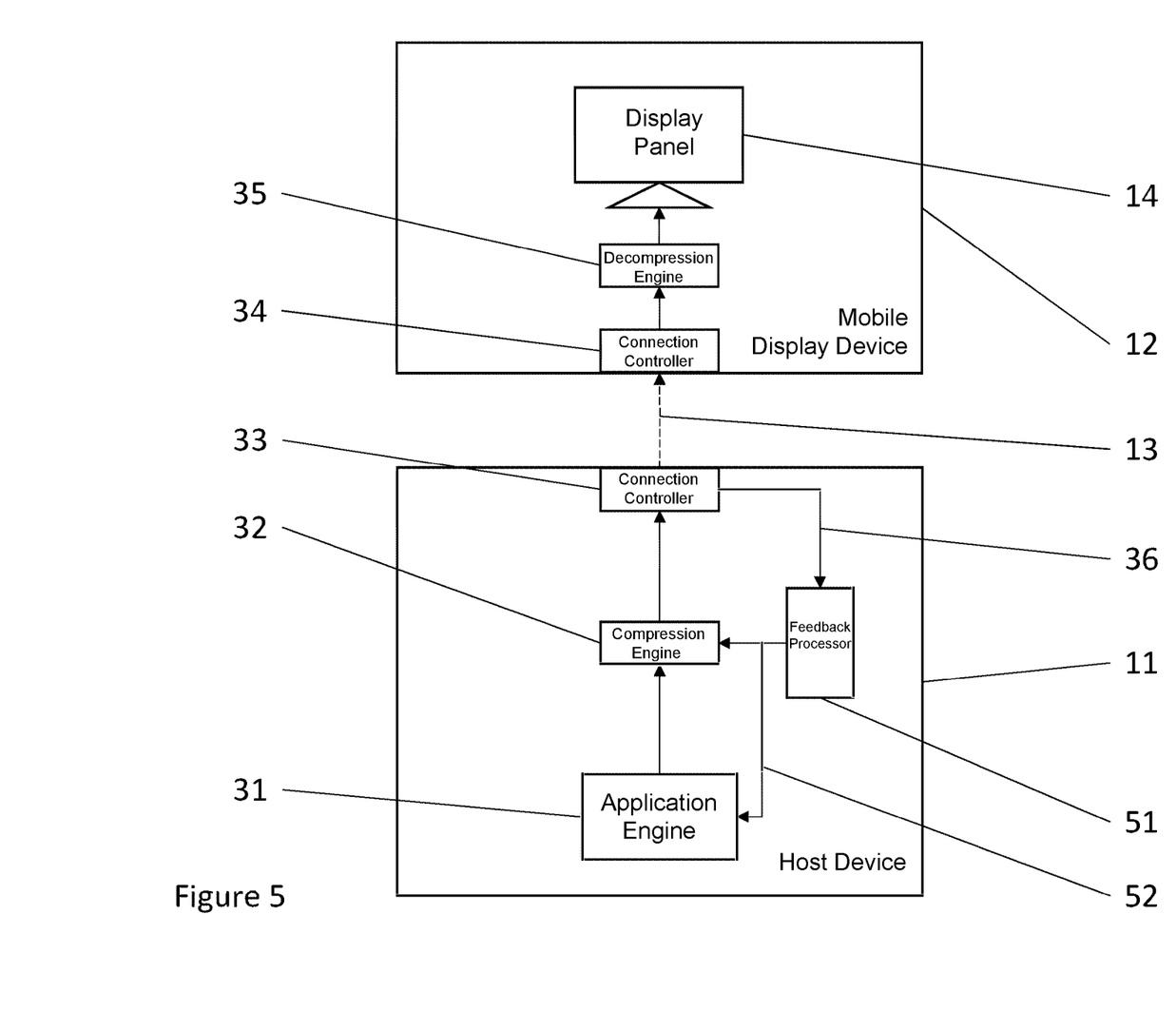
FIG. 5 shows a detail of some internal components of the devices in a second embodiment of the invention.

FIG. 5 shows a second example system. It is similar to the examples shown in FIG. 3, but in this example the host-side connection controller [33] is connected to a feedback processor [51], which receives the feedback on the bandwidth of the connection [13] from the host-side connection controller [33] and generates instructions for both the compression engine [32] and the application engine [31].

The instructions comprise commands to apply a particular level of compression, in the case of the compression engine [32], and to generate data at a particular level of compressibility in the case of the application engine [31]. This can allow the two engines [32, 31] to be more closely co-ordinated, as the application engine [31] can be instructed to produce data of a compressibility that will be perfectly suited to efficient compression by the compression engine [32].

The compressed data is then transmitted by the host-side connection controller [33] to the device-side connection controller [34], passed to the decompression engine [35] for decompression, and displayed on the display panel [14] as previously described.

This embodiment is an improvement over current methods, which are commonly based on increasing the compression, since it will result in fewer visible data artefacts as well as reducing wastage of processing power; under current art, generating complex data requires a large number of processor cycles, as does compressing such data. Both of these categories of wastage could be reduced using the methods of the invention. It also reduces the effects of attempting to deal with reductions in bandwidth through buffering or error correction because it does not inherently increase latency.

Figure 6:
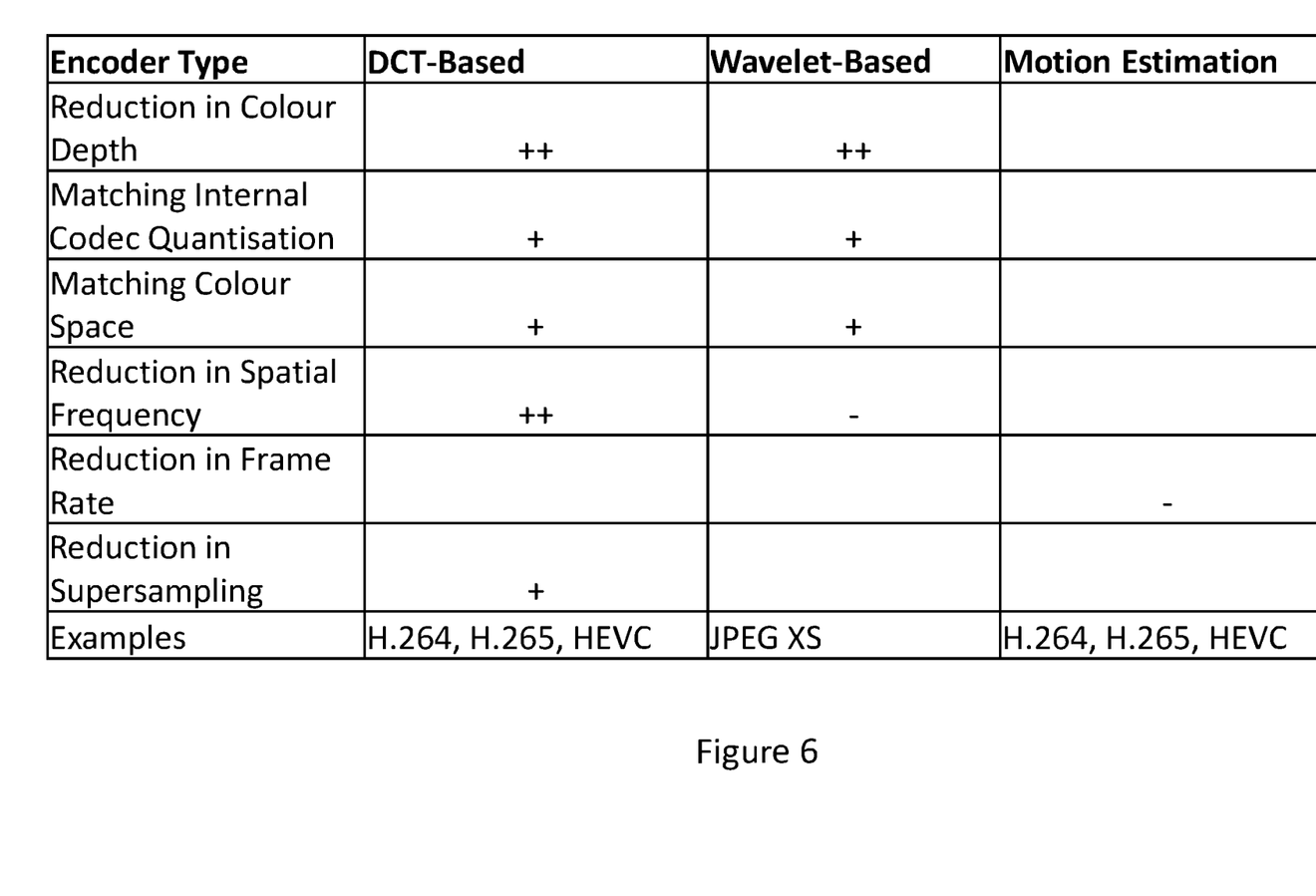
FIG. 6 is a table showing examples of some different methods of increasing compressibility depending on the type of encoder in the compression engine.

FIG. 6 shows examples of some different methods of increasing compressibility depending on the type of encoder in the compression engine [32].

For encoders which are based on Discrete Cosine Transform (DCT) algorithms, such as H.264, H.265, and HEVC, the most effective methods are likely to be:

Decreasing colour depth in order to reduce the number of quantisation steps required.

Reducing high-frequency content (spatial frequency), since DCT-based encoders tend to be less effective where there is a large variation between pixels and more effective where edges are smoother.

And some benefit may also be gained from:

Matching the quantisation level of the specific codec

Matching the colour space of the specific codec

A reduction in supersampling, meaning that images are rendered at the resolution that will be used for display rather than being rendered at a high resolution and scaled down.

If the encoder also uses motion estimation, as H.264, H.265, and HEVC all do, there will not be much, if any, benefit from reducing the frame rate, since such encoders perform very little extra processing where a frame is very similar to a previous frame. Encoders that do not use motion estimation may gain a benefit from reduced frame rate since they analyse and/or compress every frame.

For encoders which are wavelet-based, such as JPEG XS, there are also likely to be benefits from reducing the colour depth, matching the codec quantisation, and matching the codec colour space for the same reasons as for DCT-based encoders. However, reducing spatial frequency is likely to reduce the compressibility of the data for a wavelet-based encoder since wavelet-based encoding algorithms perform better where there are sharp edges with significant differences between pixels in an image. Similarly, reducing supersampling is unlikely to produce a benefit for a wavelet-based encoder.

If the application engine [31] is aware of the type of encoder (the compression algorithm being used by the encoder), it is therefore able to tailor the changes made to the image data generation to produce the data that is particularly suited for compression by that encoder.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of generating display data by a host device for transmission over a variable bandwidth connection to a display control device for display, the method comprising:

receiving, at the host device over a time period for the transmission of the display data, information indicative of available bandwidth on the variable bandwidth connection between the host device and the display control device, wherein the available bandwidth on the variable bandwidth connection changes over the time period;

dynamically setting, at the host device based on the information indicative of the available bandwidth, one or more parameters used to generate the display data that change a compressibility of the display data, wherein a plurality of levels of the compressibility of the display data is based on a plurality of amounts of compression associated with the one or more parameters, and wherein the plurality of levels of the compressibility changes over the time period based on the available bandwidth changing over the time period;

generating, at the host device, the display data using the one or more parameters;

determining whether to reduce a resolution of all of the generated display data or an edge of the generated display data based on the available bandwidth;

compressing the generated display data based on the determining;

transmitting the compressed display data to the display control device; and altering the compressibility of the compressed display data over the time period based on the plurality of levels of the compressibility.

2. The method of claim 1, wherein the information indicative of available bandwidth on the variable bandwidth connection provides information indicative of a plurality of changes in the available bandwidth of the time period.

3. The method of claim 1, further comprising comparing the information indicative of available bandwidth on the variable bandwidth connection with a plurality of threshold levels and wherein the setting one or more parameters is based on whether the information is above or below one of the plurality of threshold levels.

4. The method of claim 3, wherein in response to the comparison indicating that the available bandwidth is below a first threshold of the plurality of threshold levels, one of the one or more parameters are set so that the generated display data has a first compressibility.

5. The method of claim 4, wherein in response to the comparison indicating that the available bandwidth is above the first threshold of the plurality of threshold levels, one of the one or more parameters are set so that the generated display data has a second compressibility that is lower than the first compressibility.

6. The method of claim 5, wherein in response to the comparison indicating that the available bandwidth is above a second threshold of the plurality of threshold levels, one of the one or more parameters are set so that the generated display data has a third compressibility that is lower than the second compressibility.

7. The method of claim 3, wherein one or more different parameters of the one or more parameters are adjusted based on whether the information is above or below one of the plurality of threshold levels.

8. The method of claim 1, wherein the information indicative of available bandwidth is based on at least one of a signal level on a connection, a link radio modulation mode, traffic on the connection, or a data rate of any return signals from the display control device.

9. The method of claim 1, wherein the one or more parameters comprise at least one of a parameter controlling a colour depth, a parameter controlling a colour space, a parameter controlling a spatial frequency, a parameter controlling a quantisation level, a parameter controlling supersampling, or a parameter controlling a frame rate.

10. The method of claim 9, wherein the dynamically setting of the one or more parameters is further based on a compression algorithm used when compressing the display data.

11. A non-transitory computer readable medium including executable instructions which, when executed in a processing system, cause the processing system to perform a method of generating display data by a host device for transmission over a variable bandwidth connection to a display control device for display, the method comprising:

receiving, at the host device over a time period for the transmission of the display data, information indicative of available bandwidth on the variable bandwidth connection between the host device and the display control device, wherein the available bandwidth on the variable bandwidth connection changes over the time period;

dynamically setting, at the host device based on the information indicative of the available bandwidth, one or more parameters used to generate the display data that change a compressibility of the display data, wherein a plurality of levels of the compressibility of the display data is based on a plurality of amounts of compression associated with the one or more parameters, and wherein the plurality of levels of the compressibility changes over the time period based on the available bandwidth changing over the time period;

generating, at the host device, the display data using the one or more parameters;

determining whether to reduce a resolution of all of the generated display data or an edge of the generated display data based on the available bandwidth;

compressing the generated display data based on the determining;

transmitting the compressed display data to the display control device; and altering the compressibility of the compressed display data over the time period based on the plurality of levels of the compressibility.

12. A host device configured to generate display data for transmission over a variable bandwidth connection to a display control device for display, by:

receiving, over a time period for the transmission of the display data, information indicative of available bandwidth on the variable bandwidth connection between the host device and the display control device, wherein the available bandwidth on the variable bandwidth connection changes over the time period;

dynamically setting, based on the information indicative of the available bandwidth, one or more parameters used to generate the display data that change a compressibility of the display data, wherein a plurality of levels of the compressibility of the display data is based on a plurality of amounts of compression associated with the one or more parameters;

generating the display data using the one or more parameters;

determining whether to reduce a resolution of all of the generated display data or an edge of the generated display data based on the available bandwidth;

compressing the generated display data;

transmitting the compressed display data to the display control device; and altering the compressibility of the compressed display data over the time period based on the plurality of levels of the compressibility.

13. The host device of claim 12, wherein the host device is further configured to generate the display data by:

comparing the information indicative of available bandwidth on the variable bandwidth connection with a plurality of threshold levels, and wherein the setting one or more parameters is based on whether the information is above or below one of the plurality of threshold levels.

14. The host device of claim 12, wherein the information indicative of available bandwidth is based on at least one of a signal level on a connection, a link radio modulation mode, traffic on the connection, or a data rate of any return signals from the display control device.

15. The host device of claim 12, wherein the one or more parameters comprise at least one of a parameter controlling a colour depth, a parameter controlling a colour space, a parameter controlling a spatial frequency, a parameter controlling a quantisation level, a parameter controlling super-sampling, or a parameter controlling a frame rate.

16. The host device of claim 15, wherein the dynamically setting of the one or more parameters is further based on a compression algorithm used when compressing the display data.

17. A system comprising the host device of claim 12 and the display control device coupled to the host device over the variable bandwidth connection.

18. The system of claim 17, wherein the display control device provides at least some of the information indicative of available bandwidth on the variable bandwidth connection.

19. The system of claim 17, wherein the display control device is coupled to control a display in a head mounted display device comprising a virtual-reality (VR) or augmented-reality (AR) headset.

* * * * *